UNITED STATES PATENT OFFICE.

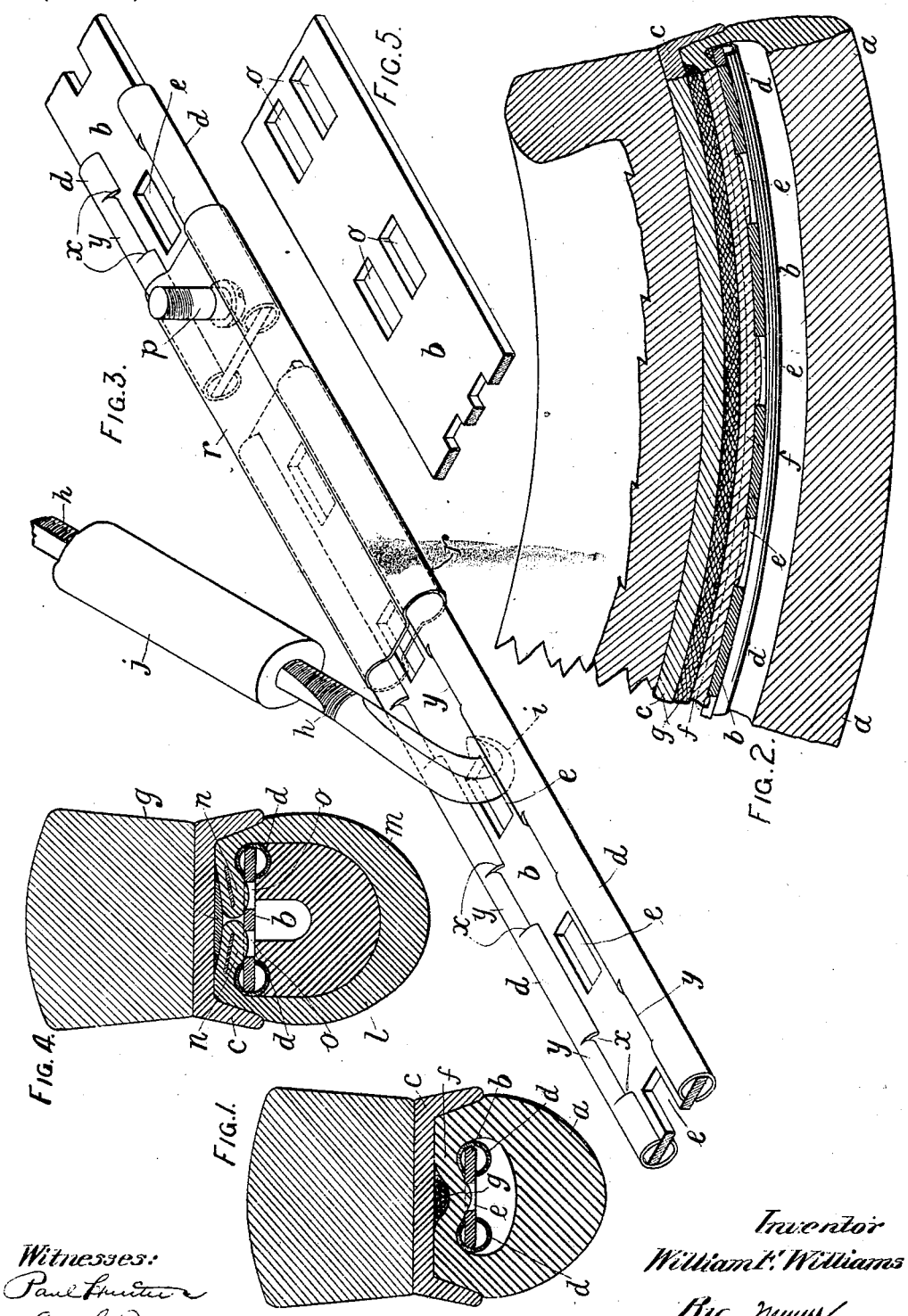

WILLIAM FREDERICK WILLIAMS, OF LONDON, ENGLAND.

SECURING ELASTIC TIRES TO WHEELS.

SPECIFICATION forming part of Letters Patent No. 682,012, dated September 3, 1901.

Application filed April 13, 1901. Serial No. 55,749. (No model.)

*To all whom it may concern:*

Be it known that I, WILLIAM FREDERICK WILLIAMS, gentleman, a subject of the King of Great Britain, residing at 17 and 18 Great Pulteney street, Golden Square, London, England, have invented new and useful Improvements in Securing Elastic Tires to Wheels, of which the following is a specification.

My invention relates to improvements in securing an elastic tire to the wheel-rim by means of a band so applied as to bind the base of the tire or tire-cover to its seat in the grooved wheel-rim; and the improvements have for their object to prevent cutting of the tire or its cover, as the case may be, by the edges of the holding-on band and to prevent creeping of the tire upon the wheel-rim.

Reference is to be had to the accompanying drawings, wherein—

Figure 1 is a cross-section, and Fig. 2 is a part longitudinal section, of a tire as secured to the wheel-rim. Fig. 3 is a perspective view of a portion of the inner face of the band straightened out, showing the jointing-sleeve and tightening-screw. Fig. 4 is a cross-section of a tire, showing the band as applied to grip the inturned flanges of the tire-cover. Fig. 5 is a perspective view of a portion of the band used in Fig. 4.

Referring to Figs. 1, 2, and 3, $a$ is the elastic tire, of D or approximately D section, and $b$ is the holding-on band, passing through the tire and clamping the base thereof to its seat in the grooved rim $c$ of the wheel. The tire may be made of rubber or other suitable material and may or may not have embedded in it a fibrous cord or cords extending circumferentially around the bore of the tire or otherwise in order to strengthen it.

With a view to prevent the cutting or tearing of the sides of the tire the edges of the band $b$ are inclosed by sheaths $d$ in the form of tubes longitudinally slitted, so as to admit of being slipped over the edges of the band $b$. These sheaths may be formed of strips of mild steel, zinc, or other metal capable of being drawn or other suitable material, such as vulcanized fiber, for instance. The metal or material must also be capable of being easily bent to the curvature of the wheel-rim when the tire $a$, with the band $b$ and sheaths $d$ passed through it, is lapped around the wheel-rim $c$. The sheaths $d$ are drawn or otherwise brought to the form of longitudinally-slitted tubes, the slit being preferably just wide enough to admit the thickness of the band $b$, so that the sheaths will grip the band sufficiently to remain in position thereon while the whole is being slipped through the tire. When thus inserted, the sheaths present to the sides of the tire externally-rounded surfaces of considerable area compared with the narrow edges of the band $b$, which they inclose, and cause the pressure and friction to be so distributed as to avoid all liability of the tire being torn or cut by pressure against the edges of the band. As the sheaths are merely slipped on to the edges of the band, they are free to accommodate themselves to a certain extent to the pressure with which the band is pressed against the base of the tire, and in order to prevent the tire from creeping around the wheel-rim there are punched or otherwise formed in the band $b$ at frequent intervals throughout its length holes or slots $e$, into which the base $f$ of the tire becomes squeezed or pressed when the band is drawn tight, so as to form a sufficiently interlocking engagement to prevent all relative motion of the tire and band in the circumferential direction. These apertures $e$ would preferably be of rectangular form, as shown, their ends being transverse and presenting sharp or square arrises, whereby to obtain a grip of the compressible material forming the base $f$ of the tire. In order to insure the latter being pressed into the slots, a bedding or packing-up piece $g$, formed of cord or other suitable material, may be lapped around and cemented or otherwise secured to the wheel-rim $c$ or to the base of the tire at the middle of its width, (or the rim $c$ might be rolled with a central rib or corrugation to take the place of this cord,) so as to cause the slotted portion of the band $b$ to bear hard upon the corresponding portion of the base $f$ of the tire notwithstanding the offset produced by the projection of the sheaths and so insure the squeezing of the compressible material of the base $f$ into the slots $e$ of the band and such firm engagement of the tire therewith that all creeping of the tire will be prevented. The slots $e$ toward the free end of the band may serve also for the engagement with the band of the device, whereby to apply the necessary tension to the band for the purpose of clasping the base $f$ of the tire firmly to the wheel-rim. The preferred form of device for this purpose consists of a screw-stem $h$, Fig. 3, terminating at its outer end in a hook $i$, adapted to be engaged in one of the slots $e$, the screw passing through a hole or slit in the base $f$ of the tire, through a hole in the wheel-rim $c$, and through a guide-socket traversing the wheel-felly in an inclined direction, the screw being engaged by a nut at the end of a rotatable sleeve $j$, received in the socket and bearing against a shoulder therein, so as when turned to draw on the screw and so tighten the band. As this particular form of tightener, however, forms the subject of a previous application for Letters Patent, it is not here claimed.

In the case of a tire formed of a spring-cushion $l$, inclosed in a detachable cover $m$, as in Fig. 4, the holding-on band $b$ would be applied to clasp the inturned flanges $n$ of the cover, as shown. The band would be provided with sheaths $d$, inclosing the edges of the band as before, but instead of a single row of slots $e$ there would be a double row, as at $o$ in Fig. 5, these slots being in the part of the band which comes upon the flanges $n$ of the tire-cover, as indicated in Fig. 4. The flanges $n$ are formed integrally with the cover $m$ and of rubber or of layers of rubber-coated canvas, so as to possess the necessary tensile strength and the compressibility required to allow them to be squeezed into the slots $o$ of the band sufficiently to cause such an interlocking grip as to prevent creeping of the tire.

It will be understood that instead of rectangular slots holes of round or other form may be used, and instead of being punched completely through the band $b$ they may be mere cavities or depressions punched or otherwise formed in the under surface of the band, so that the material of the base $f$ or flanges $n$ (as the case may be) will enter said cavities or depressions sufficiently to enable the desired grip or interlocking engagement with the band to be obtained.

In order to prevent creeping of the tubular beadings or sheaths $d$ relatively to the band $b$ and tire, the sheaths may be partially notched out on the side which bears against the base of the tire or tire-cover. Such notches may be formed, as shown in Fig. 3, by making pairs of cross-cuts $x$ in the edge of the sheath $d$ at intervals and bending down or clenching against the band $b$ the portion $y$ intervening between the cross-cuts of a pair. The end of the holding-on band $b$, which is non-adjustably secured to the wheel-rim $c$ by a screw $p$, is inserted, together with its edge sheaths $d$, in the end of a tubular socket $r$, of thin sheet metal, adapted by its cross-sectional form to closely fit upon the band and edge sheaths, the socket being fixed by the same screw $p$ and extending a sufficient distance beyond the fixed end of the band to form a guide-socket in which the free ends of the band and its edge sheaths are received when the band is being tightened up, the band and sheaths having been previously cut to such length that the free ends thereof will not quite meet the fixed ends when the band is fully tightened up, the socket thus covering the joint in the band and crossing the joint in the tire, which joint would preferably be situated at the same point in the circumference as the screw $p$.

I claim—

1. The combination, with the holding-on band for a hollow elastic tire or tire-cover, of sheaths or beadings for the edges of the band, formed of longitudinally-slitted tubes embracing the edges of the band and presenting a rounded external surface to contact with the sides of the tire or tire-cover, as described.

2. The combination, with a holding-on band for an elastic tire, of longitudinally-slitted tubular sheaths embracing the edges of the band, the sheaths being notched at intervals, as and for the purpose described.

3. The combination with the holding-on band for a hollow elastic tire or tire-cover, and with longitudinally-slitted tubular sheaths or beadings for the edges of the band, of a joint-covering socket secured to the fixed end of the band and to the wheel-rim and adapted to form a guide for the free end of the band and sheaths when being tightened up, substantially as specified.

4. The combination with a rubber tire of D-section, of a holding-on band applied to clasp the base of the tire to the wheel-rim, longitudinally-slitted tubular sheaths embracing the edges of the band and intervening between them and the adjacent sides of the tire or tire-cover, a row or rows of holes or cavities in the band, and a circumferential projection on the tire-seat in the wheel-rim opposite the row or rows of holes or cavities, so as to force the material of the tire-base into interlocking engagement with said holes or cavities in the band, as described.

WILLIAM FREDERICK WILLIAMS.

Witnesses:
T. W. KENNARD,
C. C. M. GIBSON.